United States Patent [19]
Colineau

[11] Patent Number: 5,920,448
[45] Date of Patent: Jul. 6, 1999

[54] MATRIX TYPE RECORDING/READING HEAD WITH ZIGZAG STRUCTURE

[75] Inventor: Joseph Colineau, Bures sur Yvette, France

[73] Assignee: Thomson-CSF, Paris, France

[21] Appl. No.: 08/949,398

[22] Filed: Oct. 14, 1997

Related U.S. Application Data

[63] Continuation of application No. 08/641,810, May 2, 1996, abandoned.

[30]     Foreign Application Priority Data

Jun. 6, 1995  [FR]   France .................................. 95 06651

[51] Int. Cl.$^6$ ........................................................ G11B 5/29
[52] U.S. Cl. ............................................................. 360/121
[58] Field of Search ..................................... 360/119, 121, 360/122, 125, 115

[56]              References Cited

U.S. PATENT DOCUMENTS

| | | | |
|---|---|---|---|
| 4,300,178 | 11/1981 | Saitou et al. ............................. | 360/121 |
| 4,425,533 | 1/1984 | Colineau et al. ......................... | 315/408 |
| 4,438,375 | 3/1984 | Colineau et al. ......................... | 315/408 |
| 4,439,793 | 3/1984 | Nater ........................................ | 360/121 |
| 4,539,615 | 9/1985 | Arai et al. ................................ | 360/121 |
| 4,621,281 | 11/1986 | Colineau ................................... | 358/60 |
| 4,706,115 | 11/1987 | Colineau et al. ........................... | 358/60 |
| 5,063,467 | 11/1991 | Colineau et al. ......................... | 360/119 |
| 5,124,869 | 6/1992 | Lehureau .................................. | 360/121 |
| 5,189,579 | 2/1993 | Colineau ................................... | 360/121 |
| 5,212,680 | 5/1993 | Toupin ..................................... | 369/99 |
| 5,227,938 | 7/1993 | Colineau et al. ......................... | 360/114 |
| 5,282,104 | 1/1994 | Coutellier et al. ....................... | 360/115 |
| 5,459,619 | 10/1995 | Colineau et al. ......................... | 360/113 |

FOREIGN PATENT DOCUMENTS

| | | |
|---|---|---|
| 0 392 906 | 10/1990 | European Pat. Off. . |
| 0 409 675 | 1/1991 | European Pat. Off. . |
| 19 06 358 | 8/1969 | Germany . |
| 7 107 030 | 11/1971 | Netherlands . |

OTHER PUBLICATIONS

IBM Technical Disclosure Bulletin, "Interleaved Multielement Magnetic Head", Kington, vol. 15, No. 6, p. 2035, Nov. 1972.

IBM Technical Disclosure Bulletin, vol. 36, No. 5, May 1, 1993 pp. 377–378, "Compact Horizontal Head Structure For Arrays.".

*Primary Examiner*—David L. Ometz
*Attorney, Agent, or Firm*—Oblon, Spivak, McClelland, Maier & Neustadt, P.C.

[57]                ABSTRACT

A recording/reading head for multitrack information media including magnetic tape recorders comprises a matrix of elementary heads positioned in rows and columns. The columns, and especially the neighboring columns, are not parallel to one another.

5 Claims, 6 Drawing Sheets

MATRIX TYPE RECORDING/READING HEAD WITH ZIGZAG STRUCTURE

This application is a continuation of application Ser. No. 08/641,810, filed on May 2, 1996, now abandoned.

BACKGROUND OF THE INVENTION

The invention relates to a matrix type recording/reading head for information media in which the elementary heads are arranged in the form of a zigzag structure. It can be applied especially to the recording/reading of multitrack recording media such as magnetic recorder tapes in the technologies of computer peripherals, professional recorders, professional video tape recorders as well as video tape recorders used for large scale consumer applications.

Matrix head structures designed for multitrack recording on magnetic tapes have been described in the French patent No. 2 630 853. As can be seen in FIGS. 1 to 3, the head consists of two functional sub-assemblies: an upper part, made in the form of thin layers having the gaps M1, M2 and the magnetic poles of the heads 17.1, 18.1, and a lower part generally made by means of conventional technology (in volume) bearing the excitation coils (14.1). The invention relates to an arrangement of the magnetic poles and of the gaps by which the working of the component can be made less sensitive to the imperfections of guidance of the magnetic tape.

The device includes a wafer 10 made of magnetic material such as ferrite with rectilinear grooves $11_1, 11_2 \ldots, 12_1, 12_2 \ldots$ on one of its faces 13. The grooves $11_1, 11_2 \ldots$ are parallel to each other and form rows while the grooves $12_1, 12_2 \ldots$ are perpendicular to the rows and form columns. In each groove, there is an electrical conductor $14_1, 14_2 \ldots, 15_1, 15_2 \ldots$. The conductor $14_1$ is placed in the groove $11_1$, the conductor $14_2$ is placed in groove $11_2, \ldots$, the conductor $15_1$ is in groove $12_1$ etc. Another wafer 16 is bonded to the wafer 10. The wafer 16 is made of nonmagnetic material. On the unoccupied face $16_1$ of the wafer 16 are formed the pole pieces 17, 18 and the gap 19 of a series of magnetic heads, the number of which is equal to the number of intersections.

In order to make devices enabling the recording of the narrow contiguous tracks without placing excessive constraints on the technology, all the writing gaps are arranged in n columns of m gaps (FIG. 1). These various gaps are offset with respect to one another in order to fill the surface of the tape with contiguous tracks (FIG. 2). The gaps are therefore positioned in an oblique network whose horizontal and vertical periods are substantially greater than the track width. This arrangement leads to writing that is spatially offset on each of the tracks. If the tape is affected by guiding defects leading to vertical shifts, the heads located towards the rear may partially erase the tracks already written on by the heads located in the front (FIG. 3). The most critical case is that of the last column of the heads facing the tracks written on by the first column, since the spatial distance between these two groups of tracks is n times greater than it is between the other consecutive groups of tracks. Owing to this effect, it becomes necessary to compress the dynamic constraints of guidance by a factor n, or not to use the first group of tracks to its maximum capacity.

The means of avoiding this effect is to position the gaps in such a way that the contiguous tracks are always written on by groups of gaps whose distance in the running direction is the minimum, namely by neighboring groups of gaps (or possibly by the same group of gaps).

SUMMARY OF THE INVENTION

U0 The invention therefore refers to a recording/reading head for information media comprising a matrix of recording/reading elements positioned in rows and columns, wherein two neighboring rows (or columns) are not parallel.

BRIEF DESCRIPTION OF THE DRAWINGS

The different objects and characteristics of the invention shall appear more clearly from the following description and from the appended figures, of which.

MORE DETAILED DESCRIPTION

Figure 4:
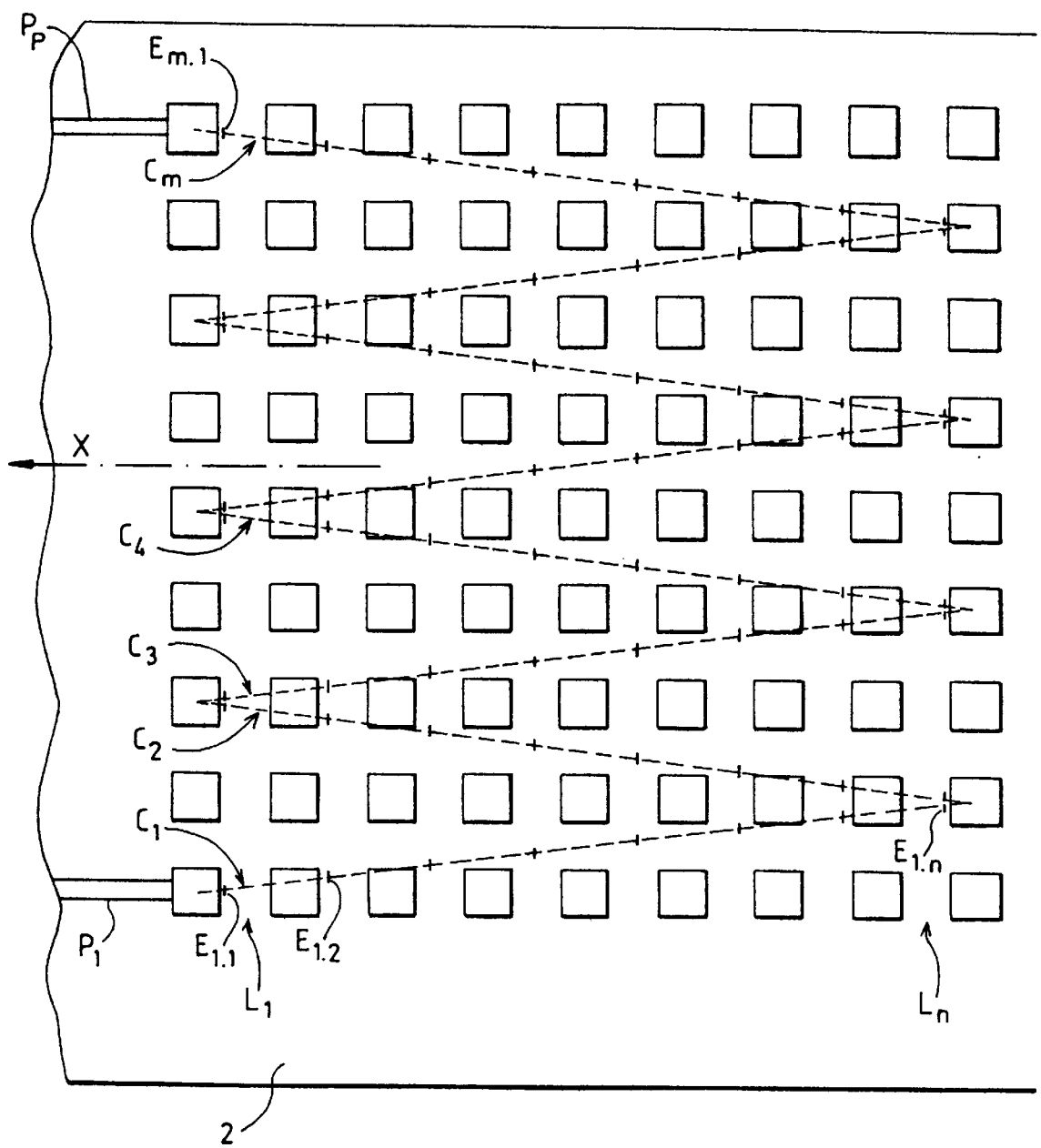
FIG. 4 shows a matrix recording/reading head according to the invention.

Referring to FIG. 4, a description shall be given first of all of an exemplary embodiment of a recording/reading matrix head according to the invention. This head has a set of recording/reading elements arranged in rows and columns. The row L1 has the elements $E_{1,1}$ to $E_{m,1}$ and the column C1 has the elements $E_{1,1}$ to $E_{1,n}$. According to one exemplary embodiment, a recording medium 2 is required to shift in a direction X so as to record (or read) tracks P1 to Pp. The rows, such as L1, are then perpendicular or substantially perpendicular to this direction X. The columns C1 to Cm form an acute angle with the direction X. Two neighboring columns are concurrent. According to the example of FIG. 4, the odd-order columns C1, C3, are parallel to one another and the even-order columns C2, C4 are parallel to one another. Furthermore, two neighboring columns are symmetrical to the direction X.

When the recording medium 2 shifts before the recording head, the element or elementary head $E_{1,1}$ goes through the track P1 and reads or records this track. The element $E_{1,2}$ goes through the track P2, the element $E_{1,n}$ goes through the track Pn and the element $E_{m,1}$ goes through the track Pm. The number of tracks read or recorded is therefore p=m.n.

The recording/reading elements may be the gaps of magnetic heads or any other means capable of recording or reading on a recording medium.

According to the technology described with reference to FIG. 1, the magnetic poles located on either side of a gap may have different lengths.

Figure 5:
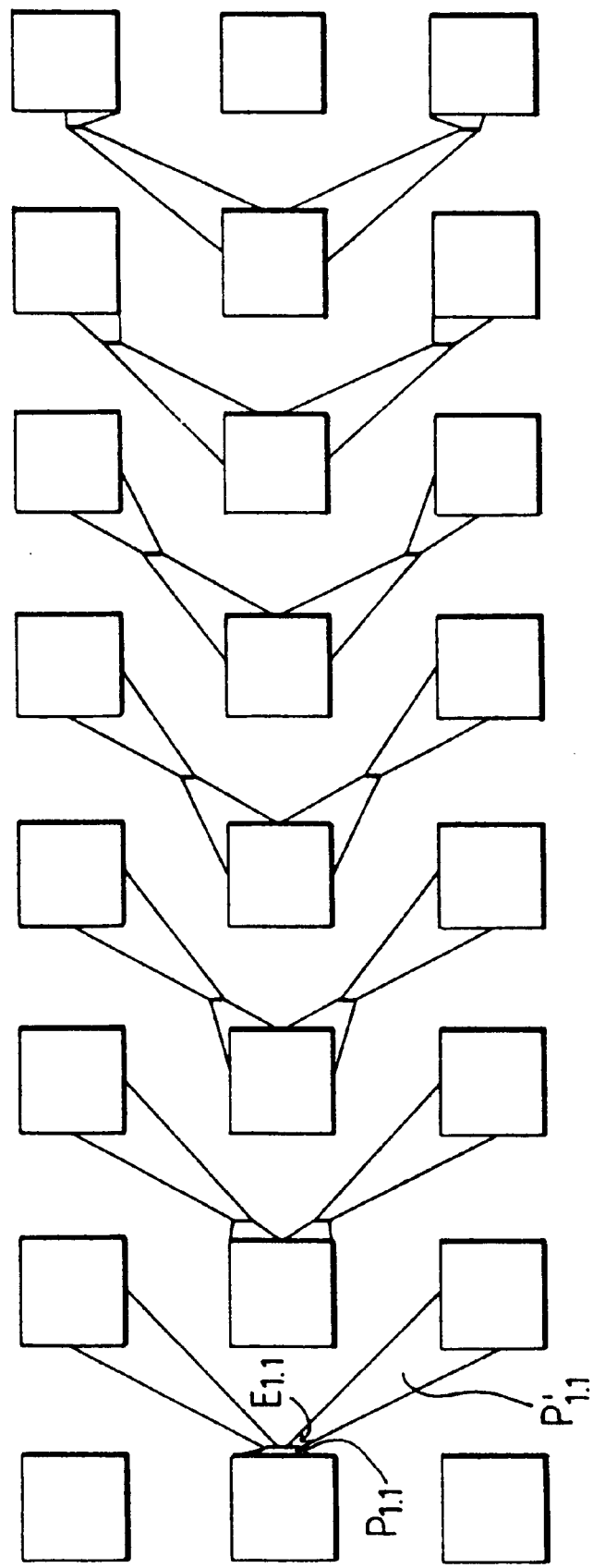
FIG. 5 shows a detail of an elementary recording/reading head applicable to FIG. 4.

Thus, in FIG. 5, the gap $E_{1,1}$ is demarcated by the poles $P_{1,1}$ and $P'_{1,1}$, the pole $P_{1,1}$ being shorter than the pole $P'_{1,1}$. By contrast, the gap $E_{1,n}$ is demarcated by a pole $P_{1,n}$ and by a pole $P'_{1,n}$ which is shorter than the pole $P_1$. The lengths of the poles vary gradually along a column from one magnetic head to the next one, from a maximum length such as that of $P'_{1,1}$ to a minimum length such as that of $P_{1,1}$.

Figure 1:
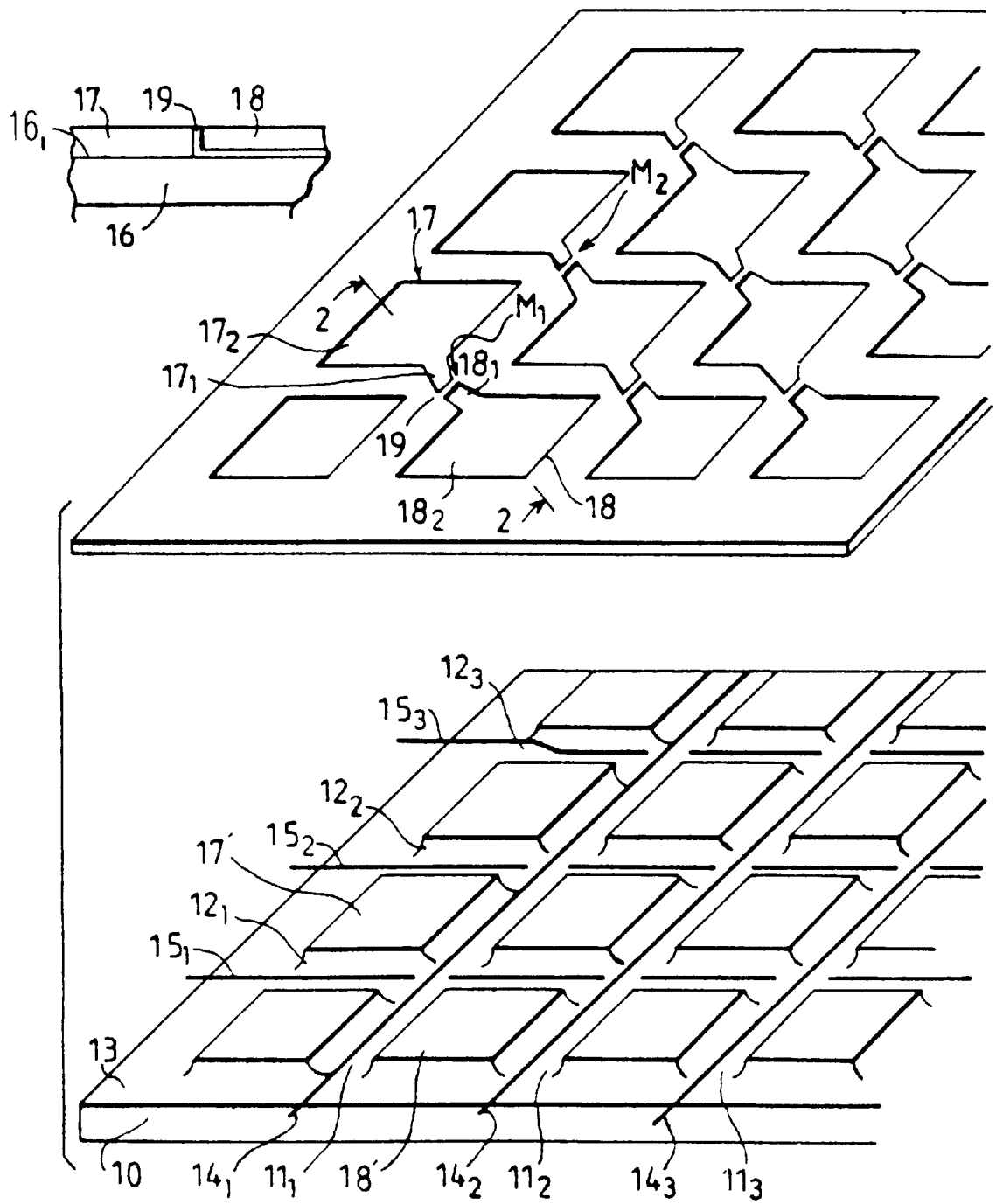
FIGS. 1 to 3 show devices known in the prior art described here above.
Figure 2:
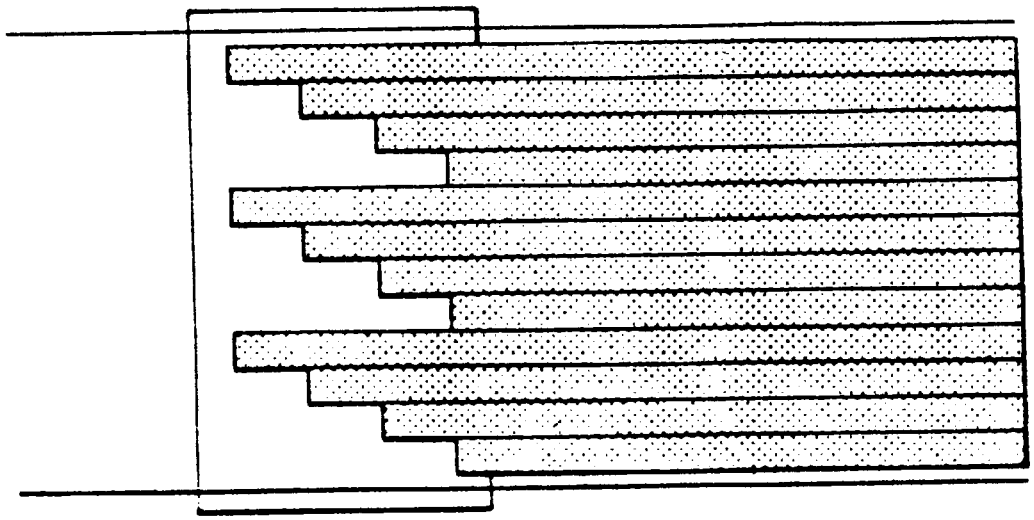
Figure 3:
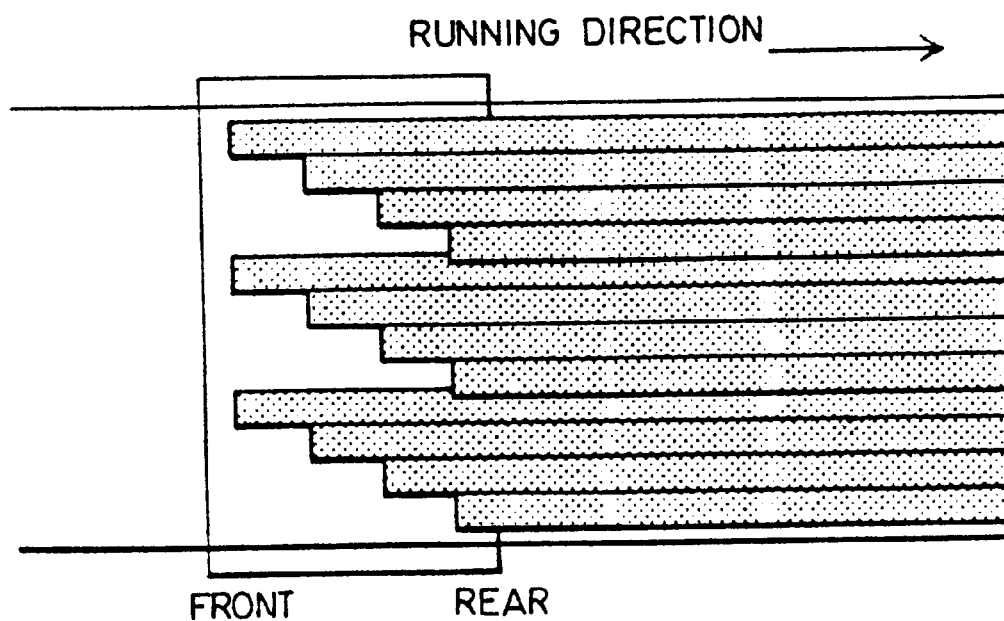

As shown in FIG. 1, the magnetic poles are magnetically coupled to magnetic pads such as 18' that enable the closing of the magnetic circuits of the magnetic heads by the plate 10.

Figure 7:
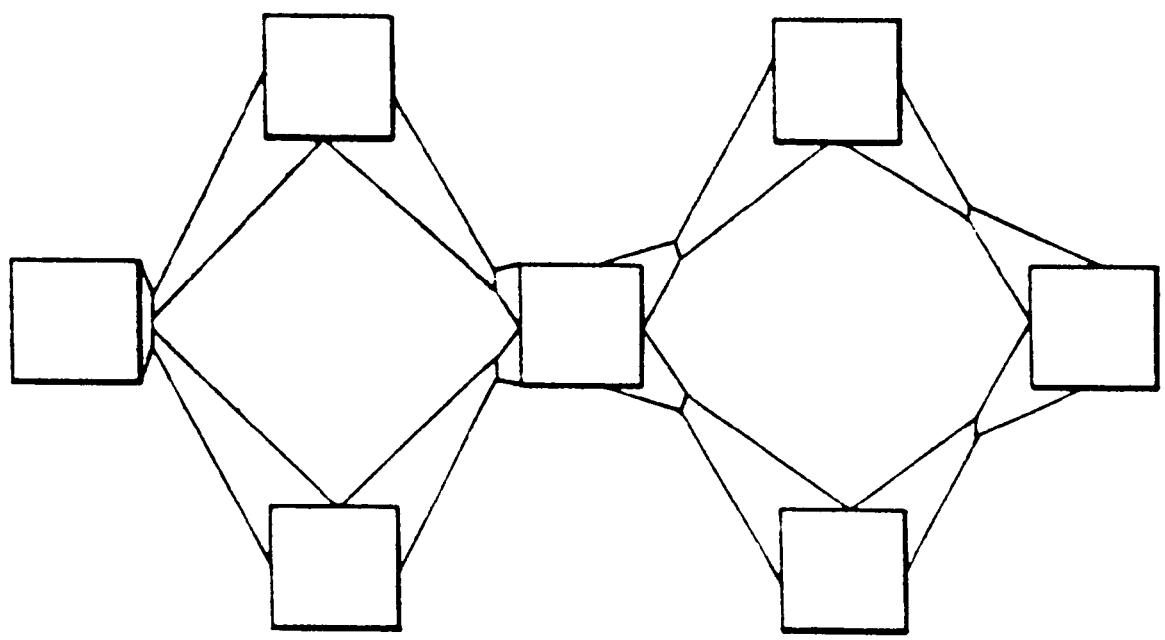
FIG. 7 shows an alternative embodiment of a recording/reading head according to the invention.

According to one alternative embodiment shown in FIG. 7, and applying an embodiment described in the French patent referred to here above, fewer magnetic pads are provided for than pads in the configuration of FIG. 5. For this purpose, to each pad there are magnetically coupled four poles instead of two in FIG. 5. The principle of different lengths of the poles remains the same in this configuration.

Figure 6:
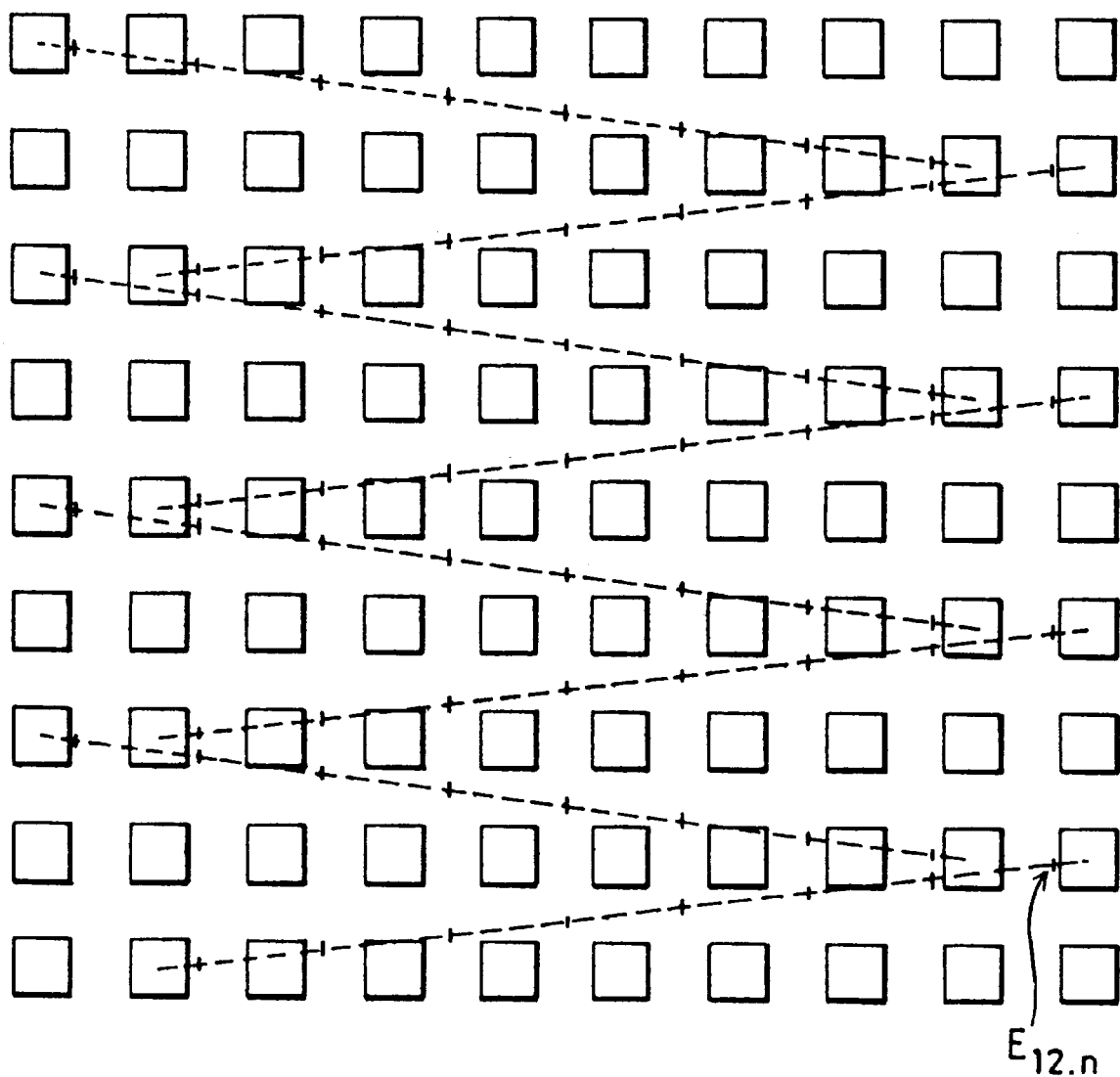
FIG. 6 shows a variant of a matrix head according to the invention.

In the configuration of FIG. 4, there are two elementary heads side by side between two neighboring columns. This is the case of the elementary heads $E_{1,n}$ and $E_{2,n}$. This may make it difficult to provide a clear definition of the tracks pertaining to these heads owing to the limitations of the etching methods. FIG. 6 provides an alternative that resolves this problem. In this alternative, an elementary head E12n for example is common to two neighboring columns.

This makes it possible to observe that the working will not be affected by the particular arrangement of the gaps. Indeed, each gap is located on a diagonal connecting two magnetic pads, above one (and only one) intersection of excitation wires of the rows and columns. The fact that it is not at the center of this pattern does not modify the magnetic excitation that it receives, if the permeability of the material forming the poles is sufficiently great.

The other differences with presently known embodiments are the following:

- the network of conductors and of grooves of rows and columns is herein rectangular, unlike with presently existing structures where the horizontal lines are generally positioned obliquely so that the gaps, which are positioned on oblique rows in order to write on adjacent tracks, remain at the center of each pattern;
- the vertical rows of gaps are not located at the center of the vertical grooves, thus enabling an increase in the distance between poles and pads of ferrite in the columns external to the head.

What is claimed is:

1. A recording/reading head for information media comprising a matrix of recording/reading elements positioned in rows and columns in a same plane, wherein two neighboring rows or two neighboring columns are never parallel in said plane and also do not share a common recoding/reading element; and wherein said neighboring rows or columns are symmetrical with respect to a direction of shift in relation to an information medium.

2. A recording/reading head according to claim 1, wherein each said recording/reading element enables the recording, on the information medium, of an information mark with a determined width measured in a direction perpendicular to the direction of shift, and wherein the angle of each row or the angle of each column with the direction of shift is such that the recording/reading elements enable the recording/reading of different tracks on the recording medium, the tracks being contiguous or not contiguous.

3. A recording/reading head according to claim 1, wherein the even-order rows or columns are parallel to one another and the odd-order rows or columns are parallel to one another.

4. A recording/reading head for information media comprising:

- a matrix of recording/reading elements consisting of gaps of elementary magnetic heads, said gaps positioned in rows and columns wherein two neighboring rows or two neighboring columns are not parallel;
- said reading/recording head further comprising a matrix of said magnetic heads for the closing of the magnetic field, a pad being connected to a neighboring pad by two magnetic poles separated by one of said gaps, the lengths of the poles of the elementary magnetic heads of one and the same column being different.

5. A recorcding/reading head according to claim 4, wherein the lengths of the magnetic poles of one and the same column vary gradually from one elementary head to the next head.

* * * * *